Patented Jan. 1, 1929.

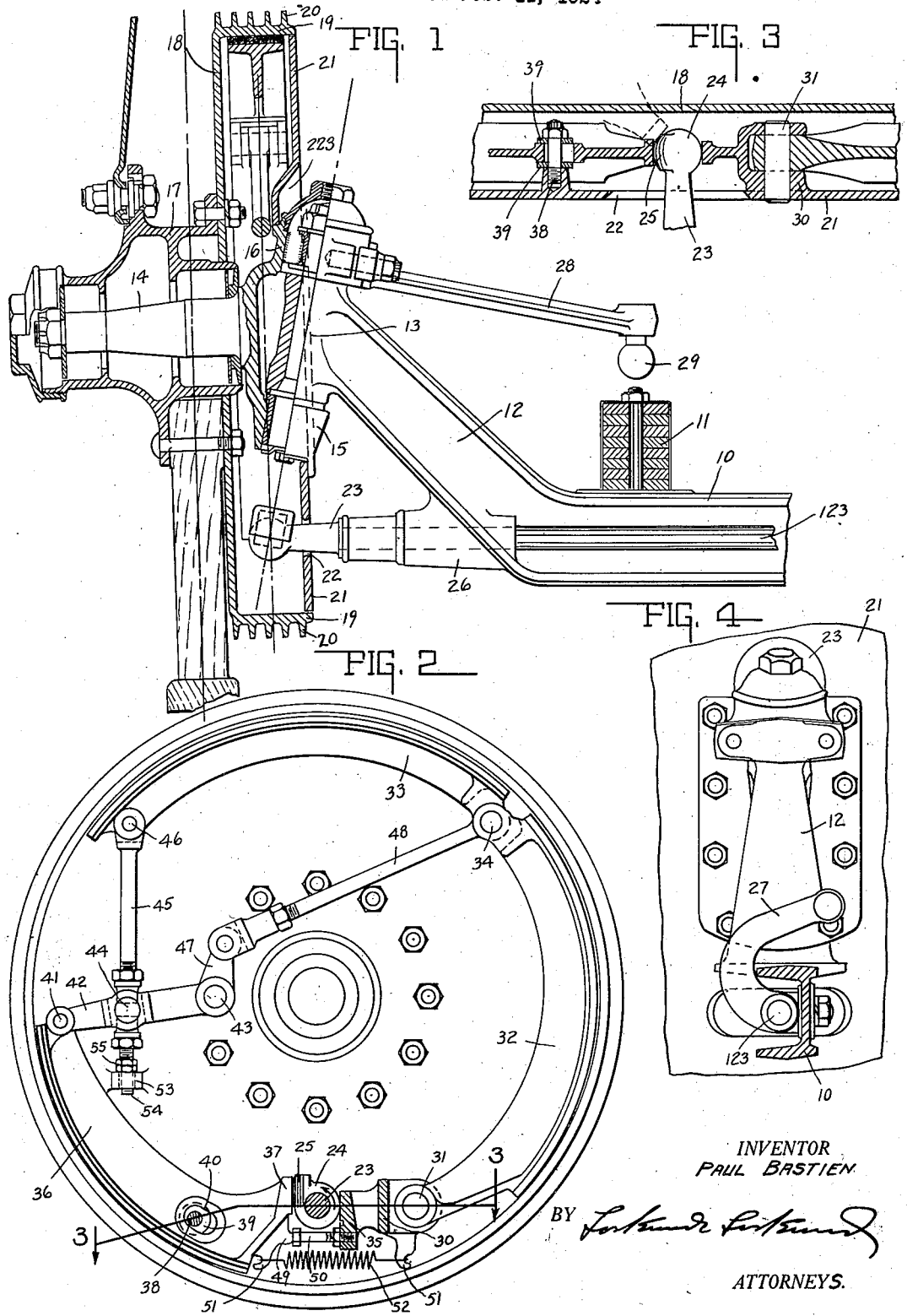

1,697,838

UNITED STATES PATENT OFFICE.

PAUL BASTIEN, OF INDIANAPOLIS, INDIANA.

MULTIPLYING SEGMENTAL BRAKE.

REISSUED

Application filed February 11, 1924, Serial No. 692,196. Renewed May 5, 1928.

This invention relates to a brake construction, and herein the same is illustrated as applied to an expanding type brake, as will be readily understood by automotive engineers skilled in this art.

The chief object of the invention is to improve brake constructions at present utilized by constructing the brake in such a manner that more efficient operation will be secured therefrom with the same or less power applied to the actuating parts as is now applied thereto.

Another main feature of the invention consists in arranging the brake shoe such that the greater portion of its total surface will be operative for braking in forward driving and but a minor portion of its total surface will be operative for braking in reverse driving. The brake, therefore, is constructed for normal usage.

Another main feature of the invention is to construct the brake shoe in such a manner that it will be of the articulated type, having a plurality of sections connected together and movable into braking position and engaging the drum by a plurality of means operable from a common source.

A third main feature of the invention consists in the multiplying feature disclosed herein and which is associated with the two before-mentioned features, to secure a most highly desirable and most effectively operable brake.

Another chief object of the invention is to secure a brake construction which is self-acting, in that the faster the vehicle travels, the greater will be the braking power applied thereto by the vehicle upon brake initiation by the operator of the vehicle. The herein described invention so functions that the faster the vehicle travels, the greater will be the braking force exerted, although but little effort is necessary to initiate the braking action. It will be furthermore understood that in each instance the weight of the vehicle and the possible maximum speed of the same or the horse power of the engine thereof will be determining factors in the design of the brake construction and in the brake area necessarily provided to secure efficient braking action.

The full nature of the invention will be understood from the accompanying drawings and the following description and claims:

In the drawings, Fig. 1 is a sectional view of a dirigible wheel equipped with an expanding brake construction supported by an axle. Fig. 2 is a side elevational view of the brake drum shoe and associated parts. Fig. 3 is a sectional view taken on the line 3—3 of Fig. 2 and in the direction of the arrows. Fig. 4 is an elevational view of the spindle and wheel mounting shown in Fig. 1.

In the drawings 10 indicates an axle carrying the spring means 11 for supporting the framework of the vehicle. An offset portion 12 of the axle terminates in the king pin receiving portion 13, having an axis inclined to the vertical. A spindle 14 is provided with the usual king pin upper and lower bearings 15 and 16, which support said spindle at an angle to the horizontal. The spindle 14 carries the wheel construction including the hub 17, and to said hub or any other suitable portion of the wheel, there is secured a drum having a plate portion 18 which terminates in a peripheral portion 19 provided with reenforcing and cooling fins 20 thereon. The inner surface of the peripheral portion 19 forms the shoe engaging or braking surface of the brake drum. Parallel to the drum 18 and stationarily supported by the spindle construction and movable therewith is a closure plate 21 provided with a slot 22 and also depressed or formed at 223 so as to form a relatively complete closure.

Extending through the slot 22 is a shaft 23, which terminates in a substantially spherical cam 24 having an enlarged portion 25 for actuating the brake in one direction only. The shaft 23 is pivotally supported in a bracket or guide 26 rigidly attached to the axle 10, by being formed integral therewith as herein disclosed. The shaft 23 is extended as shown at 123, and associated therewith is a lever 27 which is suitably actuated from the vehicle. Thus the brakes upon two opposite wheels can be applied from a common source; and when the brakes are applied to four wheels, any suitable linkage or equivalent construction may be provided for actuating all four brakes simultaneously.

It will be readily apparent that application of the brake to non-dirigible wheels is relatively simple compared with the application of the brake to a dirigible wheel. Herein the latter application is illustrated because it is the most complicated. The essential feature necessary is to secure efficient braking action without interference with the dirigible action of the wheel and to secure efficient dirigible action without interfering with the braking action. This arrangement requires that the actuating portion, to-wit, the cam 24, terminate at the king pin axis upon which the wheel is dirigibly mounted, and preferably at the intersection with the plane of the brake drum or a plane parallel thereto. Herein such a plane is the median plane of the brake construction and is suitably indicated by the dotted line. As shown in Fig. 1, there is associated with the spindle an actuating construction 28 terminating in a portion 29 connected with the steering mechanism of the vehicle, whereby the dirigibly mounted wheel is adapted to be guided.

The foregoing includes many minor features of the invention and the following includes the major features of the invention. Herein as shown clearly in Figs. 2 and 3 to which reference will particularly be had, there is illustrated a yoke-shaped support 30 suitably secured to the plate 21, and in said yoke there is provided a pivot 31 which pivotally supports or anchors the drum engaging construction herein shown of the expanding type, and, therefore, a shoe. The shoe is of suitable and herein T-shaped cross section, see Fig. 1, and in the present invention the shoe is comprised of an articulated construction; the same in this instance being secured by hinging the shoe sections 32 and 33 together at 34 by the pin. The yoke 30 is provided with an extension or abutment 35 upon which the circular portion 24 of the cam 25 is adapted to bear. As shown clearly in Fig. 2, the articulated shoe includes a surface adapted to engage substantially more than half of the brake drum.

Associated with said articulated shoe construction is a means for actuating and moving the same into drum engaging position. Herein such a mechanism includes a similarly formed but much smaller surfaced shoe section 36 which terminates at 37 in a bearing surface adjacent the cam 25 and engageable by said cam. A pin 38 is carried by the plate 21 and suitable washers 39 restrain said shoe from lateral movement but permit arcuate movement with respect to the wheel drum axis when engaged by the cam 25. For this purpose the shoe section 36 is provided with a curved and elongated slot 40. The opposite end of the shoe section 36 includes a pivot 41, which pivot is connected to a lever 42 pivotally supported at 43 upon the plate 21. The lever 42 intermediate its ends is provided with an oscillating joint 44, and adjustably associated with said oscillating joint is a link 45 pivotally connected at 46 to the free end of the articulated shoe construction previously described. Herein the lever 42 is of the bell crank type, having an extension or arm 47; and pivotally supported at opposite ends of the adjustable link rod 48 is the lever 47 and the pivot 34 at one of the articulations.

The bearing surface 37 is provided with an extension 49 adapted to engage an adjustable abutment 50 which limits the return movement of the shoe section 36 when actuated, as hereinafter to be described. The abutment 49 and the yoke 30 are provided with a hook portion 51 to which is secured a coil spring 52 for normally retracting the shoe section 36 into its non-engaged position and to maintain the same in engagement with the cam 25.

The operation of the foregoing braking construction is as follows: When the shaft 23 is rocked counterclockwise as shown by the arrow, see Fig. 2, the cam 25 engages the surface 37 and causes the shoe 36 to move annularly in the direction of rotation of the drum when the vehicle is driven forward. Such movement causes the drum to engage the surface of the shoe and to pull it with a force proportional to the speed of the drum, and, therefore, the speed of the vehicle. Such a force is exerted through the pivot 41 upon the lever 42 pivotally supported upon the plate 21 at 43. It may be assumed that the shoe construction is not articulated. With this assumption, it will be understood that the force opposing said force applied to the lever 42 is the force exerted through the link rod 45. Thus, a multiplying result or ratio is obtained, dependent upon the ratio of the lever arms, to-wit, the perpendicular distance between the application of forces from the pivot 41 to the pivot 42 and from the pivot 44 to the pivot 43. Thus, a multiplying effect is secured which is transmitted to the articulated shoe construction 32—33. To increase the effectiveness of such braking action and also to insure relatively quick release, the lever arm 47 is provided and this lever arm transmits part of the force applied to the pivot 41 which otherwise would be transmitted through the pivot 44, and thus the excessive strain exerted upon the pivot 46 is reduced because a portion of it is exerted through the pivot 34. It will be remembered that the articulated shoe section is anchored at 31.

In reverse driving, which is generally at a much slower speed than forward driving, the amount of braking power required is not as great. Therefore, in reverse driving, the cam 25 engages the abutment 37 and forces the shoe section 36 into engagement with the drum now revolving counterclockwise. This, then is direct braking action for section 36; but due to the direction of drum rotation, the articulated shoe construction does not engage the drum for any reverse braking action. In either instance when the shaft 23 is actuated, and thereafter released, the spring 52 provides a means for returning all of the parts to the released position, determinable by the adjustable stop 50. Herein the articulated shoe construction is shown provided with but one pivot or hinge. It may be here noted that the plate 21 carries a guide 53 adapted to slidably receive a stem 54 carrying the adjusting and locking nuts 55, whereby the released position of the lever construction pivoted at 43 is determined. Herein the invention illustrates an unbalanced braking surface for forward and reverse braking. The broader feature of the invention includes the self-multiplying feature.

While the invention has been described in great detail in the foregoing specification and various modifications thereof others will readily suggest themselves to those skilled in the art to which this invention applies, all are to be considered as within the scope of the appended claims, and the foregoing detailed description is to be considered as illustrative and not restrictive in character.

The invention claim is:

1. In a brake construction, the combination of a pair of pivotally connected shoes, a third shoe, a link connected to the pair of shoes at the pivotal connection, another link connected at one end to the opposite end of one of said connected shoes, a lever connected at one end to the third shoe and movable thereby and at the other end to one of said links and to the other link intermediate the lever ends, and means for moving said third shoe into and out of braking engagement.

2. In a brake construction for a wheel, the combination of a brake drum, at least three drum engaging means, one of said drum engaging means being anchored at one end, another of said drum engaging means being movable at one end into and out of engagement with the drum, and leverage means connecting all of the other ends of the several drum engaging means together, whereby upon relative rotation of the drum in one direction the entire drum engaging means is operable for braking and upon reverse relative drum rotation at least one of said drum engaging means becomes less effective for opposite braking.

3. A device as defined by claim 2, characterized by the more effective operation of the drum engaging means being obtained with a multiplying effect through the leverage connection.

In witness whereof, I have hereunto affixed my signature.

PAUL BASTIEN.